United States Patent [19]

Cassidy et al.

[11] 4,119,200

[45] Oct. 10, 1978

[54] TAPE CASSETTE HOLDER

[75] Inventors: Raymond T. Cassidy, Ashfield; Robert St. Amand, Springfield, both of Mass.

[73] Assignee: National Blank Book Company, Inc., Holyoke, Mass.

[21] Appl. No.: 839,582

[22] Filed: Oct. 5, 1977

[51] Int. Cl.² ............................................. B65D 85/672
[52] U.S. Cl. .................................. 206/387; 206/425; 206/459; 206/815; 211/46; 312/12
[58] Field of Search ..................... 211/11, 40, 45, 46, 211/162; 312/12, 184; 206/387, 425, 815, 307, 459; 40/340, 352

[56] References Cited

U.S. PATENT DOCUMENTS

| 3,232,397 | 2/1966 | McCoy | 206/815 |
| 3,272,325 | 9/1966 | Schoenmakers | 206/387 |
| 3,702,132 | 11/1972 | Fites et al. | 206/387 |
| 3,746,180 | 7/1973 | Spiroch et al. | 312/184 |
| 3,913,995 | 10/1975 | Malcik et al. | 211/46 |
| 3,933,245 | 1/1976 | Mullen | 211/59.1 |
| 4,046,255 | 9/1977 | Ackerei | 206/387 |

FOREIGN PATENT DOCUMENTS

| 2,106,807 | 9/1971 | Fed. Rep. of Germany | 206/387 |
| 1,143,560 | 4/1957 | France | 312/184 |
| 1,034,848 | 7/1966 | United Kingdom | 206/387 |

*Primary Examiner*—William Price
*Assistant Examiner*—Bruce H. Bernstein
*Attorney, Agent, or Firm*—Chapin, Neal & Dempsey

[57] ABSTRACT

A holder for the storage, handling, and filing of sound recording magnetic tape cassettes which is an integral tray-shaped frame, includes a support beam disposed along its upper edge and an index bar extends upwardly of the beam and serves as a handle for the holder. A rectangular base or back panel depends from the lower edge of the support beam and side walls extend outwardly of the marginal edges of the base panel. Spaced posts extend upwardly of the base panel and are adapted to engage and prevent rotation of the reels of said cassette. A resilient retaining flange or tab extends from one of the side walls in spaced parallel relationship to the base panel for releasably gripping a cassette. The base panel is provided with an aperture disposed opposite the retainer tab to accommodate therein a raised land portion of the tape cassette.

4 Claims, 5 Drawing Figures

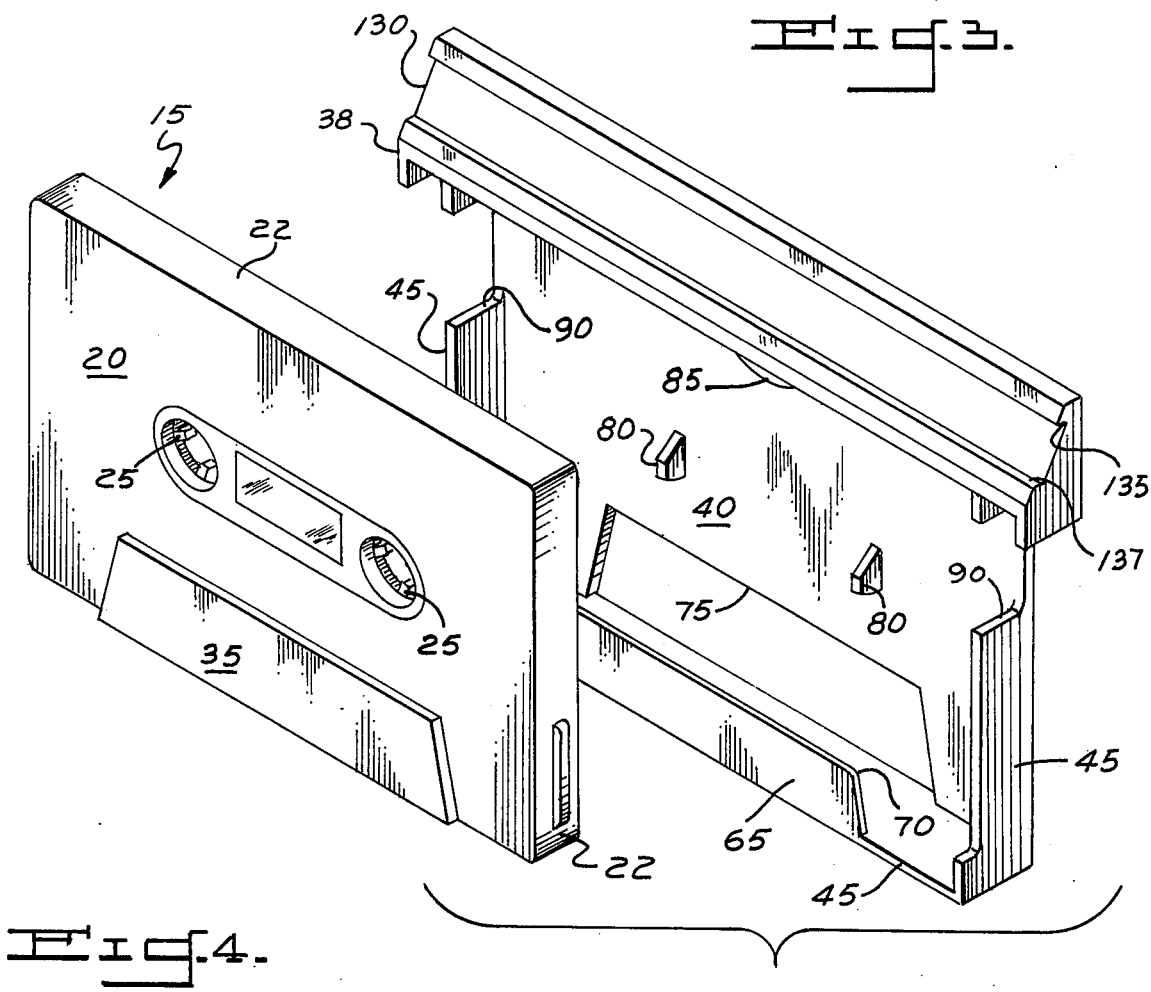
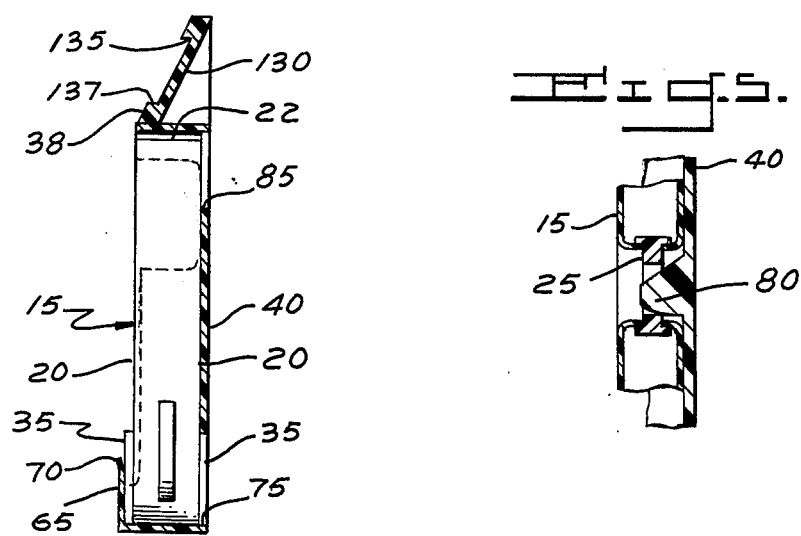
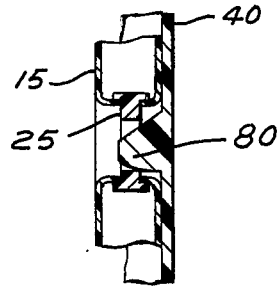

TAPE CASSETTE HOLDER

BACKGROUND

This invention relates to a frame or holder for handling and storing magnetic tape cassettes and particularly to a holder which is adapted for use in a tape cassette storage file or drawer.

Magnetic tape wound on reels in compact cassettes has achieved great popularity not only for entertainment purposes, but also in business and in education. Such cassettes are used for any application where sound recording is advantageous, including information storage in data processing systems, dictating and transcribing applications. Thus, it is desirable to provide a convenient and economic means of storage, cataloging and filing numbers of magnetic tape cassettes.

The prior art discloses a variety of cassette holders or containers. One variety such as those disclosed in U.S. Pat. Nos. 3,746,180 to Spiroch et al and Des. 221,915 to Goldthwaite et al comprises clips which fasten to the cassette along one or two sides or edges thereof. Such clips may be useful for suspending a tape cassette in a file or preventing an unwanted rotation of the tape reels but afford little protection of the cassette when subjected to repeated use and handling.

Another variety of cassette holder such as those disclosed in U.S. Pat. Nos. 3,604,556 to Schwartz, 3,640,379 to Weingarden, 3,620,367 to Stewbel, Des. 221,193 to Goren and Des. 219,760 to Schwartz may be described generally as albums, including a plurality of separate sheets each formed with a number of receptacles to accommodate cassettes. Although such albums afford a considerable measure of protection to cassettes stored therein, they are considered unsuitable for the storage of large numbers of cassettes, each of which must be readily accessible for quick selection and use.

A third variety of tape cassette containers or holders such as those disclosed in U.S. Pat. Nos. 3,912,077 to Krynicki and 3,909,087 to Cairns comprises a cassette receiving receptable having a hinged cover or closure member. The provision of such closure members may render the container overly costly and bulky.

Accordingly, it is a principal object of the present invention to provide a tape cassette file holder which overcomes the deficiencies of the prior art.

It is another object of the present invention to provide a tape cassette file holder which is compact yet affords substantially complete protection to a tape cassette disposed therein and particularly the tape itself.

It is another object of the present invention to provide a tape cassette file holder which is convenient to use and economical to manufacture.

These and other objects will become more readily apparent from the following detailed description with reference to the accompanying drawings in which:

FIG. 3 is a three-dimensional view of the holder and a tape cassette spaced therefrom;

FIG. 4 is a sectional view taken along line 4—4 of FIG. 2, showing the cassette inserted in the holder; and FIG. 5 is a sectional view taken along line 5—5 of FIG. 2.

DESCRIPTION OF THE PREFERRED EMBODIMENT

Figure 2:
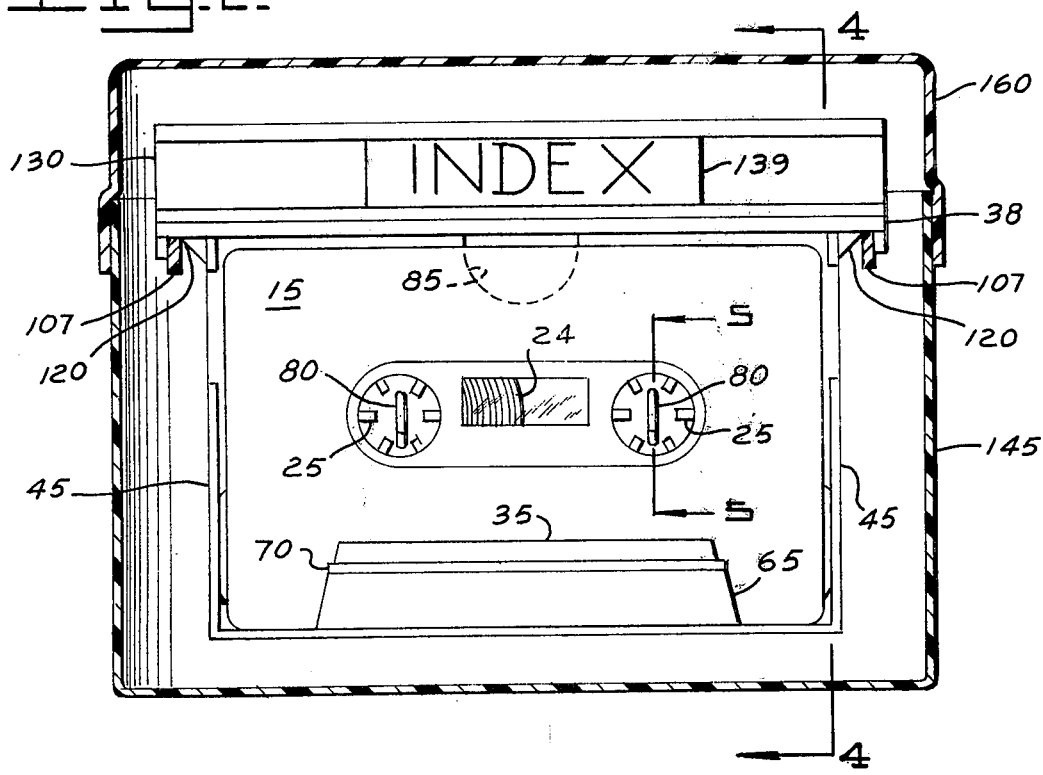
FIG. 2 is a sectional view taken along line 2—2 of FIG. 1.

Referring to the drawings, a tape cassette file holder shown generally at 10 is adapted to receive a magnetic tape cassette 15 of a standard variety. Cassette 15 (FIG. 3) comprises a plastic housing including opposed front and rear major surfaces 20 and side walls 22 enclosing a magnetic recording tape 24 (FIG. 2) wound on two spaced rotatable reels 25, each having a hub sprocket for meshing with the drive shaft of a suitable recording and playback device. The magnetic tape is exposed to recording and playback heads of the device through a slot (not shown) provided along the lower portion of the cassette side wall 22. Raised lands 35 are disposed on opposite surfaces 20 of the cassette along that portion of the cassette where the tape is exposed. These lands serve for alignment of the cassette in the recording and playback device.

Holder or retainer 10 comprises an integral generally rectangular frame which is open in one direction. This holder may be formed of any material possessing the strength required to support and shield cassette 15 from impact and jarring encountered in the ordinary handling and use thereof. In the preferred embodiment, the walls and other portions of container 10 to be hereinafter described are formed from a resilient synthetic plastic, such as polyvinyl chloride or polystyrene. The holder includes an upper support beam or bar 38, a depending base panel 40 and outwardly extending side walls 45 disposed about the perimeter of base panel 40. From the outer edge portion of the side wall 45, opposite support beam 38, the holder is provided with an inwardly extending flange or resilient tab 65 disposed in spaced parallel relation to the base panel 40. The tab 65 includes an outwardly extending oblique lip 70 formed along the free edge thereof for smoothly guiding a cassette into and out of holder 10.

Base panel 40 is provided with an aperture or cutout 75 dimensioned to accommodate one of the raised lands 35 of the cassette. By this arrangement, one major surface 20 of the cassette fits flush against the base panel 40 and the inner edges of the aperture 75 along with tab 65 assist in holding the cassette within the holder.

Base panel 40 is provided with a pair of upstanding post members 80 spaced to be received within the reels 25 of the cassette. Each post is of generally flat cross section and is dimensioned to fit between the teeth or cogs of the reel sprocket so as to prevent rotation of the reels when the cassette is fitted into the holder. The upper edges of the posts are tapered, as shown in FIG. 5, so that the posts will easily fit into the hubs of cassette reels 25.

For ease in removing the cassette from container 10, panel 40 is apertured at 85 to permit the user to insert a finger tip through the aperture to tilt the cassette outwardly of base panel 40 for easy removal from the holder. In addition, the side wall 45 is slotted as at 90 to provide means for the user to grasp the edges 22 of the cassette for its removal and insertion into the holder. The cassette may be conveniently removed by inserting a finger through aperture 85 to tilt the cassette forward while simultaneously grasping the side edges of the cassette with the other hand using slots 90.

Figure 1:
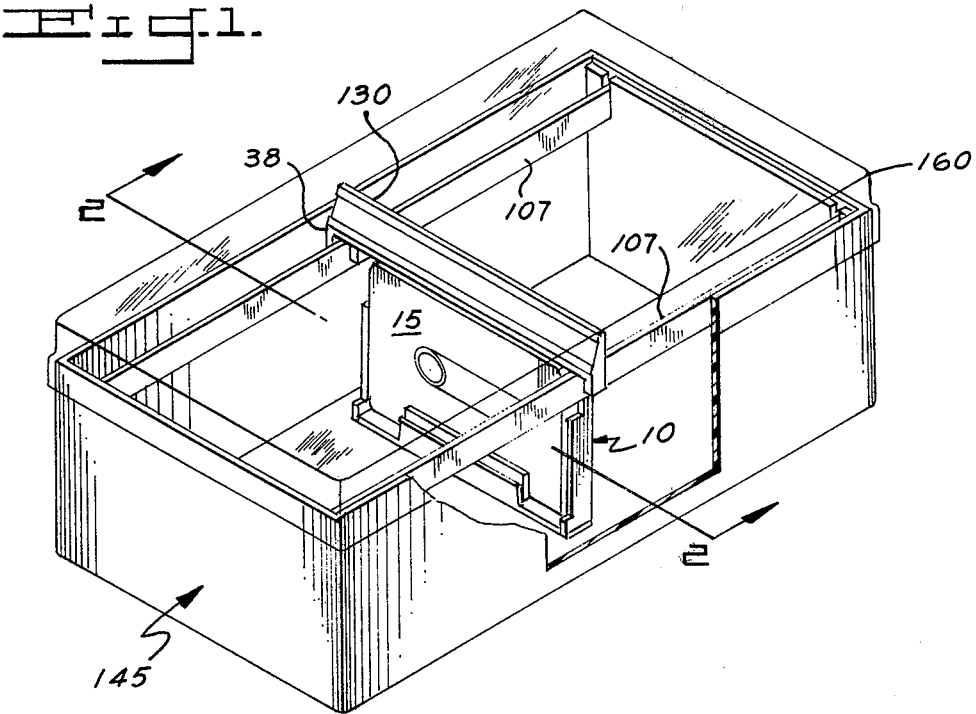
FIG. 1 is a perspective view of a tape cassette file holder of the present invention disposed within a filing tray adapted to receive and store a plurality of such holders.

In addition to affording substantial protection to the tape of a cassette stored therein, the holder of the present invention provides a convenient means of handling, carrying, storing or filing tape cassettes. For filing purposes the support beam or bar 38 extends beyond the side walls of the holder and downwardly opening notches 120 are provided to slidably receive therein a pair of longitudinally spaced parallel support rails 107 of a storage drawer or file 145 (FIGS. 1 and 2), which may be provided with a transparent cover 160. With a plurality of holder carrying cassettes disposed in file 145, the holders are readily slidable along rails 107 for selection of any particular cassette unit.

An index receiving bar 130 extends upwardly from the beam 38 and is tilted rearwardly at an oblique angle toward the plane of the base panel 40. The index bar 130 is formed with a longitudinally extending undercut recess 135 and shoulder 137 which form a channel to receive therein the edges of an index tab or strip 139 which may be imprinted with appropriate notations identifying each particular cassette. The oblique orientation of the index panel with respect to top wall 38 holds the label in an inclined orientation for easy visual observation, particularly when a number of such holders are disposed in the file in a contiguous relationship. Moreover, as best seen in FIG. 4, the channel bar 130 provides a convenient undercut handle at the top of the unit by which to grasp the holder for easy lifting or lowering the holder onto the slide rails 107 of the storage file.

A tape cassette may be inserted into each holder by tilting the cassette and inserting the lower edge of the cassette between the tab 65 and opposed lower portion of the base panel 40 until the cassette contacts the bottom wall of the holder. The cassette is then tilted rearward and pressed inwardly until its undersurface is flush with the base panel 40 and the raised land 35 of the cassette is fitted into cutout 75. When the cassette is being so inserted, the resilient tab 65 is flexed outwardly to permit ready insertion of the cassette into the holder. The cassette is removed by gripping the side edges thereof through notches 90 in side walls 45 and pulling forward and upwardly against the restraining force of resilient tab 65. For further ease in removal of the cassette from the container, a user may also push the cassette forwardly using finger access opening 85 thereby increasing the exposed gripping area of the cassette sides. When a cassette is fitted into holder 10 the posts 80 will serve to prevent rotation of the tape reels 25. In addition the slotted lower edge of the cassette where the tape is exposed in protected against damage as is the cassette itself.

As set forth above, the holder of the present invention may be formed from any material of suitable strength and rigidity. In the preferred embodiment, the container is formed from a plastic, such as polyvinyl chloride or polystyrene. Such materials allow the file container to be manufactured economically by molding. It will be appreciated that the container may be molded as a unitary structure or components thereof may be molded individually and subsequently assembled by plastic welding or bonding methods.

While there has been shown and described a single embodiment of the tape cassette file container of the present invention, it will be understood that modifications may be made without departing from this invention and it is intended by the appended claims to cover such modifications as come within the true spirit and scope of this invention.

Having thus disclosed the invention, what is claimed is:

1. A holder for cassettes having tape carrying sprocket reels which is open along its lower edge exposing said tape, the adjacent side walls of the cassette having raised lands adjacent the open edge of the cassette, said holder being of unitary structure and comprising a support beam including an upwardly extending index receiving bar, a base panel depending from said beam and being provided with a pair of laterally spaced posts extending upwardly from the base panel for engaging and holding the sprocket reels of said cassette against rotation, walls extending outwardly of the marginal edges of said base panel and forming therewith a trayshaped frame, a resilient retaining tab extending inwardly from one of said walls in spaced parallel relation to the base panel and including an outwardly flared tip along the free edge thereof, said support beam extending outwardly of the tray-shaped frame and including downwardly opening notches adapted for hanging said holder on a pair of spaced parallel rails within a filing receiptacle, said holder being provided with a cutout of a size and shape to receive therein the raised land on the undersurface of a cassette disposed within said holder, thereby providing a flush surface-to-surface contact of the cassette against the said base panel, and at least one opening adjacent said support beam and spaced from said tab to provide finger access to a cassette within said holder for tilting the same outwardly and thereby deflecting said retaining tab.

2. Holder for tape cassettes as set forth in claim 1 in which the opening comprises slots in said marginal walls adjacent said beam to provide for finger engagement of the side edges of a cassette disposed within said holder.

3. Holder for tape cassettes as set forth in claim 1 wherein said base panel includes an aperture disposed adjacent said support beam for finger access to the inner surface of a cassette disposed in said holder for ease in tilting said cassette outwardly of the holder.

4. Holder for tape cassettes as set forth in claim 1 wherein said index receiving bar extends upwardly and is tilted rearwardly with respect to the outer edges of said holder and wherein said index bar includes a channel adapted to receive an indicia carrying strip therein.

* * * * *